UNITED STATES PATENT OFFICE.

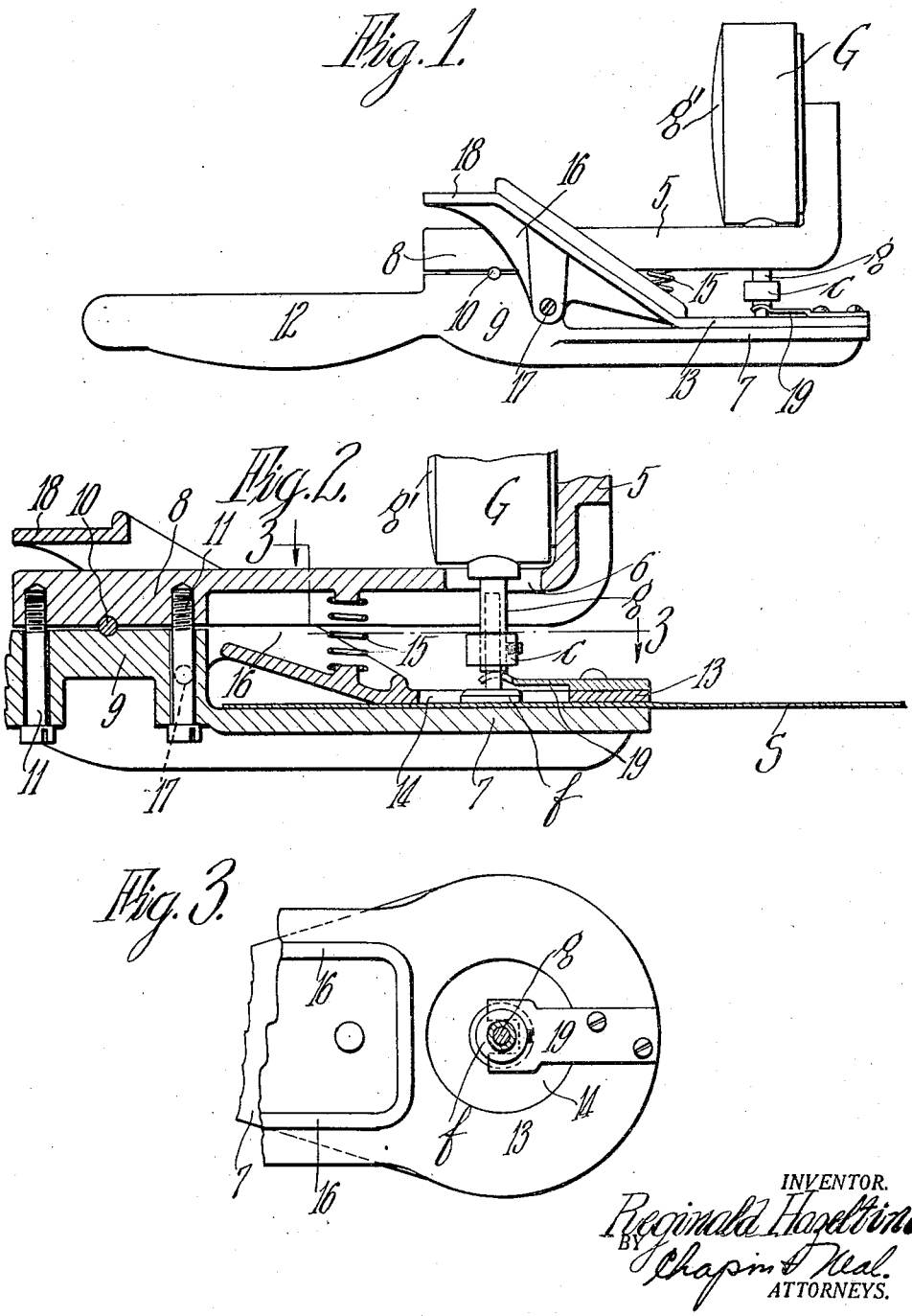

REGINALD HAZELTINE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

GAGE.

1,283,753. Specification of Letters Patent. Patented Nov. 5, 1918.

Application filed August 7, 1918. Serial No. 248,698.

*To all whom it may concern:*

Be it known that I, REGINALD HAZELTINE, a citizen of the United States of America, residing at Chicopee Falls, in the county of Hampden and State of Massachusetts, have invented certain new and useful Improvements in Gages, of which the following is a specification.

This invention relates generally to gages and more particularly to improvements in gage mountings or holders, by means of which the gage may be used with greater convenience and with improved accuracy on certain classes of work.

While the invention is capable of general application, it finds one advantageous use as a means for measuring the thickness of fabric during steps in its manufacture. For example, fabric used in the manufacture of tire shoes is friction coated with rubber in a calendering machine. During the calendering operation, it is desirable to frequently test the thickness of the fabric, and it has been the custom to cut from the web of fabric small samples which are subsequently smoothed out flat and measured with an ordinary gage. The cutting of samples, necessarily means that a certain percentage of the fabric is wasted and, moreover, the operation of cutting the sample and carrying it to the measuring device is, in itself, time consuming. The described general practice of measuring work of the character described has been rendered necessary in that accurate measurements could not readily be made with existing types of measuring apparatus. That part of the fabric gaged must needs be held flat during the gaging operation, and the springs of the usual gage are insufficient to move the measuring foot of the gage against the fabric with the necessary force for this purpose. It is not desirable to increase the tension of the springs in the gage, and moreover the measuring foot of the gage is hardly of sufficient area to properly flatten out the fabric. If made of sufficient area, the measurement may be rendered inaccurate due to protuberances or irregularities in the fabric, which might be engaged by the larger foot, whereas they would not by the smaller. This invention is concerned primarily with the elimination of the above disadvantages and the provision of means, which, among other things, are suitable for performing work of the described character.

The invention has for one object to provide in a device of the class described, a gage, an anvil, and a gage plunger having a relatively small foot to coöperate with the anvil, together with a presser foot of relatively large dimensions and operable independently of the gage plunger to force the article to be measured firmly against the anvil during its engagement by the plunger foot.

Another object of the invention is to provide a readily portable holder, which embodies a handle portion, an anvil and a gage support, and a suitable gage having a plunger to coöperate with the anvil, together with a presser foot normally forced toward the anvil by means entirely independent of the gage plunger and manually movable away from the anvil by means so located with respect to the handle portion as to be conveniently actuated by the thumb of the hand which grasps the latter, the lifting of the presser foot being made to effect the lifting of the gage plunger.

Other objects and advantages will appear in the following description and in the appended claims.

The invention, in an embodiment at present preferred, is shown for illustrative purposes in the accompanying drawings, in which:

Figure 1 is a side elevational view of a gage embodying the invention;

Fig. 2 is a slightly enlarged, fragmentary sectional elevational view thereof; and Fig. 3 is a sectional plan view taken on the line 3—3 of Fig. 2.

Referring to these drawings, the gage, indicated by refernce letter G, may be of any suitable type. Since the invention is, in the main, independent of the gage construction itself and since the detailed construction of gages suitable for the present purpose are generally well understood, it has not been thought necessary to illustrate the gage except in a conventional manner. For the present purposes, it will suffice to state that the gage is provided with a reciprocable plunger which when moved operates suitable indicating means. In the illustrated form of the invention, the indications of the gage are intended to be visible through a glass $g'$.

The gage G is suitably fastened to the upstanding arm of an angle bracket 5, and its plunger $g$ depends freely through an opening 6 provided in the other arm of bracket 5. In spaced parallel relation with and below the long arm of bracket 5 is an anvil 7 with which the foot $f$ of plunger $g$ is adapted to engage. The bracket 5 and anvil 7 are adjustably secured together. As shown in Fig. 2, the bracket 5 and anvil 7 have integral and inwardly turned extensions 8 and 9, respectively, and between the latter is a rocker 10, which rests in suitable recesses in the extensions and permits limited rocking movement of the one relatively to the other. Two screws 11, one on each side of the rocker 10, pass loosely through the extension 9 and are threaded into extension 8. By loosening one screw 11 and tightening the other, the bracket 5 may be rocked relatively to, and moved toward or away from, the anvil 7. Thus, the anvil 7 and bracket 5 may be rigidly held in the desired spaced relation but in such a manner as to permit adjustment of the distance between them, as desired.

On the opposite side of the extension 9 from the anvil 7, a handle portion 12 is provided, which may be readily and conveniently grasped for the purpose of carrying and supporting the entire assembly described. It is to be noted that, as one grasps the handle 12 in the natural manner, he necessarily faces the glass $g'$ of the gage, and thus is in a position to conveniently read the indications thereof.

The remaining and the most important feature of the invention consists in the provision of a presser foot which functions to flatten out the articles to be measured against the anvil 7 and also functions as a means for separating the foot $f$ of the gage plunger $g$ from the anvil 7. This presser foot consists of a flat member 13 having an opening 14 to loosely encompass the foot $f$. A coiled spring 15, disposed between the bracket 5 and the presser foot, normally urges the latter with considerable force against the anvil 7, or against an article thereon, which is to be gaged, as a sheet S of fabric, for example. The foot 13 has two spaced upstanding and upwardly inclined webs 16, which straddle the extensions 8 and 9 and are pivoted to the latter at 17. The webs 16 are bridged at their upper portions by a part 18, which forms a thumb piece, the latter being so arranged as to be conveniently engaged by the thumb of the same hand which is employed to grasp the handle 12. Consequently, the presser foot 13 may be readily and conveniently separated from the anvil by depressing the thumb piece 18.

Upon the presser foot 13, is secured a fork-shaped piece 19, which has its free and forked end so disposed as to partially encompass the plunger foot $f$. Adjustably secured to the plunger $g$ and overlying the forked end of piece 19 is a collar $c$, and the latter is adjusted so that, when the foot $f$ is in engagement with anvil 7, it will lie slightly above and out of engagement with the forked piece 19. When, however, the thumb piece 18 is depressed to separate the presser foot 13 from the anvil 7, the forked piece 19 will engage collar $c$ and raise the gage plunger $g$, thereby separating the foot $f$ from the anvil. The clearance between collar $c$ and the forked piece 19 has been purposely exaggerated in Fig. 1 for the purpose of clearness in the illustration. In practice, this clearance may be made very small so that the foot $f$ is separated from anvil 7 by a distance very nearly equal to and substantially the same as that by which the presser foot 13 is separated from the anvil.

The operation of the device described will be considered in connection with one only of the uses to which it may be put. Assuming that the sheet S, represented in cross-section in Fig. 2, is moving through a machine, such as a calendering machine, for example, the operator merely stops the machine for a moment to permit the gaging operation. Then with the handle portion 12 grasped by the four fingers and palm of one hand and the thumb piece 18 depressed by the thumb of the same hand, the holder is slipped edgewise over the sheet S so that the presser foot 13 and gage foot $f$ lie on one side and the anvil 7 on the other side of the sheet. The thumb piece 18 is next released, which allows the presser foot to be forced, by the relatively strong spring 15, into engagement with sheet S, whereby the latter is flattened out and firmly held for the gaging operation. The lowering of the piece 19 with the presser foot, permits the gage plunger $g$ to be lowered independently by reason of the usual gage spring (not shown) until its foot $f$ engages the sheet S. The operator may then conveniently read the indication of the gage through the glass $g'$, which he faces, and thereafter, by depressing thumb piece 18 to elevate the presser foot 13 and gage foot $f$, withdraws the gage holder from the machine.

It will thus be seen that a gage holder has been provided which is particularly suited for convenient use in measuring webs of material while they are still in the machine. The general arrangement and relative disposition of the gage support, handle portion, and thumb piece is considered important in that ready, convenient, and efficient operation of the gage is permitted in the performance of work of the character described. The provision of a combined work pressing foot and gage plunger lifting device is also important and advantageous. The arrangement of a presser foot of relatively large area, which is operable entirely independent of the gage plunger and yet is operable to lift the latter when such lifting is required, constitutes an essential feature of the present invention. According to the last-named arrangement, improved accuracy in measurement may be obtained in that the foot $f$ may be made of very small area, since it has no function in holding the work to the anvil, and in that the presser foot may be made as large as is necessary or desired, since it operates independently of the gage plunger to firmly hold the work to the anvil during the gaging operation.

The invention has been disclosed, in an embodiment at present preferred, for the purposes of illustration, but the scope of the invention is defined by the appended claims rather than by the foregoing description.

What I claim is—

1. In a device of the class described, a support, a gage thereon, an anvil connected with said support, a plunger for the gage to coöperate with the anvil, a presser foot yieldingly forced against the latter to hold an article to be measured against the anvil independently of said plunger, said presser foot being manually retractable from said anvil, and means operable on retraction of said presser foot to separate said plunger from the anvil.

2. In a device of the class described, a support, a gage thereon, an anvil connected to the support, a plunger for the gage mounted to reciprocate to and from said anvil and normally held against the latter, a pivoted lever having a relatively large presser foot portion to loosely encompass said plunger, means yieldingly forcing the presser foot against the anvil to grip an article to be measured independently of the gage plunger, said lever being manually operable to lift the presser foot away from the anvil, and means operable by the lifting of the presser foot to lift the gage plunger from the anvil.

3. In a device of the class described, a holder including a handle portion, a gage support and an anvil, a gage carried by said support and so arranged with respect to the handle portion that its indications are readily visible to the one by whom the handle portion is grasped, a gage plunger to coöperate with the anvil, a lever pivoted intermediate its ends to the holder, said lever having at one end a relatively large presser foot to coöperate with the anvil and at the other end an actuating portion so located with respect to the handle portion as to be conveniently actuated by the thumb of the hand by which the handle portion is grasped, means forcing the presser foot against the anvil to grip an article to be measured independently of said plunger, and means operable when the presser foot is moved away from the anvil to separate the gage plunger and anvil.

REGINALD HAZELTINE.

Copies of this patent may be obtained for five cents each, by addressing the "Commissioner of Patents, Washington, D. C."